Patented Sept. 8, 1936

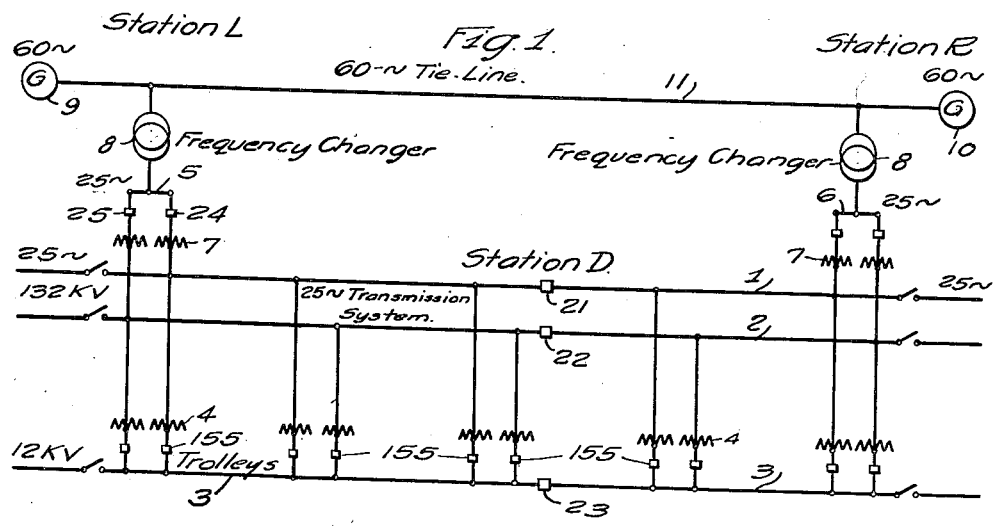

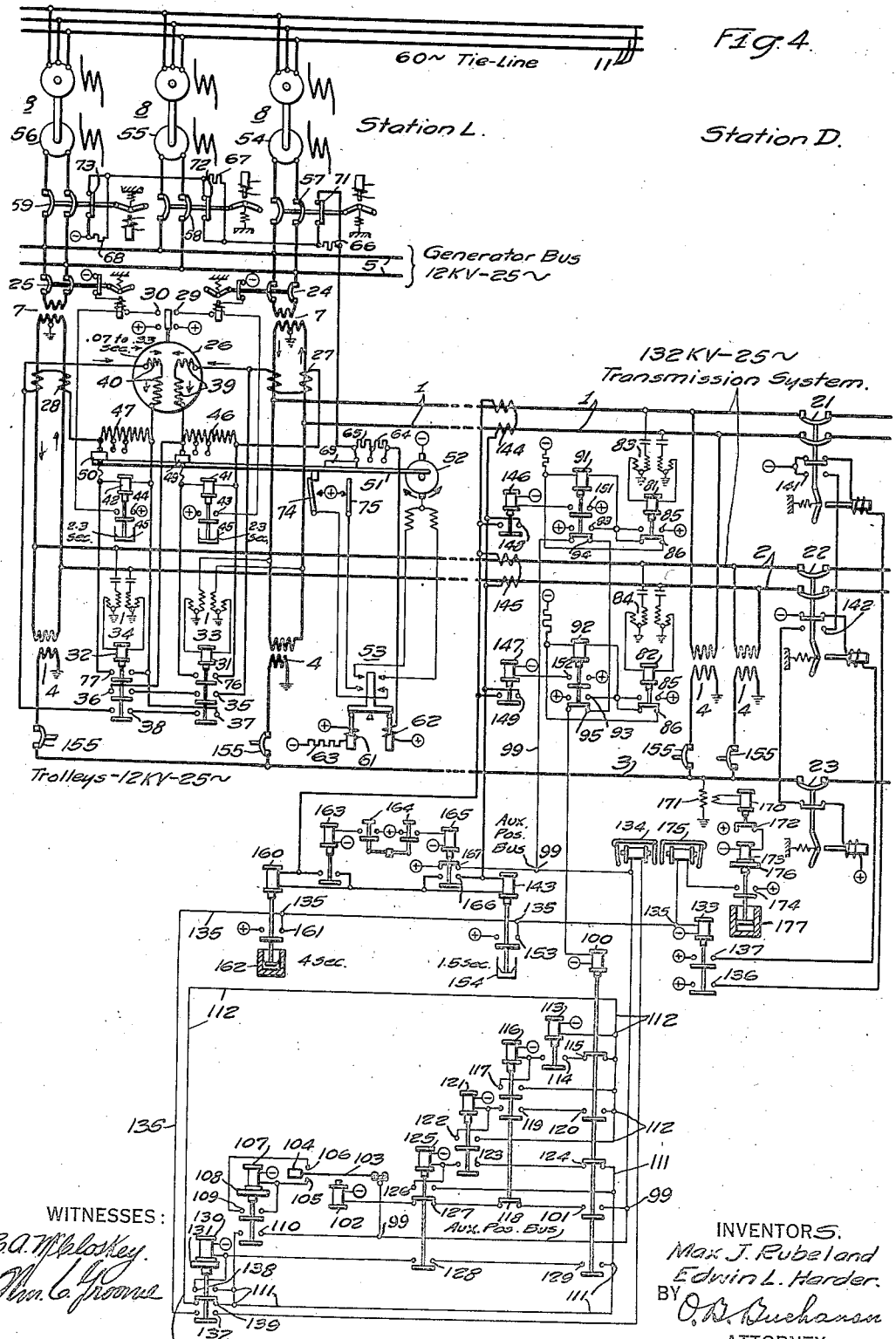

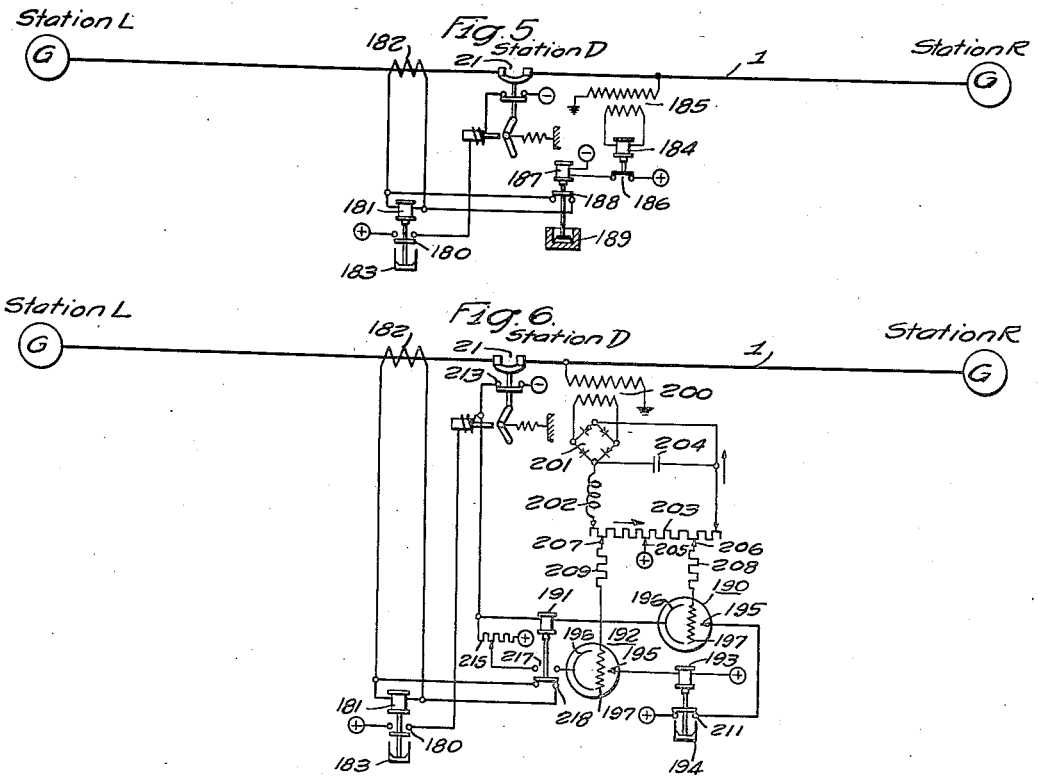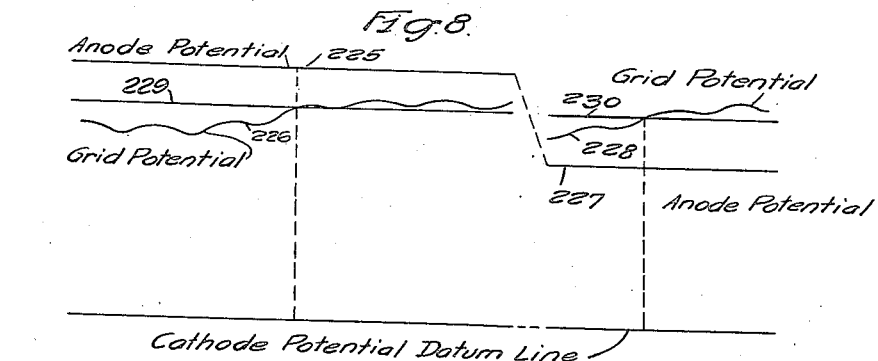

2,053,446

UNITED STATES PATENT OFFICE 2,053,446

OUT-OF-SYNCHRONISM RELAY

Max J. Rubel and Edwin L. Harder, Pittsburgh, Pa., assignors to Westinghouse Electric & Manufacturing Company, East Pittsburgh, Pa., a corporation of Pennsylvania Application August 17, 1934, Serial No. 740,252

19 Claims. (Cl. 175—294)

Our invention relates to means for automatically responding to out-of-synchronism conditions, or low-voltage conditions, in a tie-line joining synchronous transmission networks, and it relates more particularly to means for automatically interrupting the circuit of the tie-line under such conditions.

In many transmission systems, where major amounts of power are transmitted over a transmission line, it is important to discriminate between a fault involving all phase-wires, which requires the interruption of the line circuit, and out-of-synchronism conditions, which are accompanied, at times, by current and voltage conditions simulating a fault involving all phase-wires on the protected line-section, but which should not result in an interruption of the line circuit because such interruption would mean a serious service-interruption because of the loss of power. In other words, in such major-power systems, it is best to let the system operate with parts thereof out-of-synchronism with each other, for a while, while the whole is being brought into synchronism again, rather than permitting the fault-responsive protective apparatus to divide the system into a number of small sections here and there.

Our invention relates, however, to another type of transmission system, in which the tie-line to be protected normally transmits only a relatively small amount of power across the circuit-interrupting point therein, being used, for example, for the purpose of permitting additional generators, as needed, to be added first at one end of the tie-line and then at the other, instead of requiring an additional generator to be added simultaneously at both ends in order to handle the local load. In such systems, the loss of the tie-line would not cause a serious service-interruption, and usually no service-interruption at all, and moreover, the tie-line is usually too weak to bring the two ends of the system into synchronism, anyway, if they should pull apart. Under such conditions, it is the usual practice to interrupt the circuit of the tie-line as promptly as possible, as soon as the existence of out-of-synchronism conditions is known to the station-attendant.

It is a principal object of our invention to perform this tie-line sectionalizing operation automatically.

It is a further object of our invention, where more than one tie-line is involved, to avoid tie-line sectionalization of all of the tie lines under fault conditions affecting less than all of them.

It is a further object of our invention to provide fault-responsive protection at the generator stations, utilizing a promptly acting, selective, so-called primary protective means, and a retarded-action, less selective, so-called secondary protective means, at each generating station, while the out-of-synchronism protective means near the mid-point of the tie-line is set to be operative in a time intermediate between the primary and secondary fault-responsive protective means at the generator stations, for reasons that will be more fully explained hereinafter.

It is a still further object of our invention to automatically cut in the respective primary and secondary protective means only in response to certain predetermined fault conditions on the connected transmission lines, as will be explained hereinafter.

It is a still further object of our invention to automatically recalibrate a fault-responsive protective means in direct response to the number of generators in service at any time.

With the foregoing and other objects in view, as will be explained more in detail in the description which follows, our invention consists in the circuits, systems and operations hereinafter described and claimed and illustrated in the accompanying drawings, wherein:

Figure 1 is a single-line diagram of a system embodying our invention;

Figs. 2 and 3 are curves showing the relations of voltage and current during certain out-of-synchronism conditions;

Fig. 4 is a diagrammatic view of the protective equipment at one end and at the intermediate sectionalizing point of a tie-line protected in accordance with our invention;

Figs. 5 and 6 are diagrammatic views showing modifications; and

Figs. 7 and 8 are curves illustrating the operation of the apparatus shown in Fig. 6.

In the particular application of our invention which is shown diagrammatically in Fig. 1, there is a 132-kilovolt, 25-cycle transmission system embodying parallel circuits or lines 1 and 2 for supplying power to an electrified railroad embodying a system of 12 kilovolt trolleys 3 which are energized from the transmission lines 1 and 2 through step-down transformers 4 at various points along the right-of-way. The 25-cycle transmission system is supplied with power at a plurality of points, including two stations L and R, at which are located generator-buses 5 and 6, which are connected to the transmission lines 1 and 2 through step-up transformers 7. In the particular system shown, the generator buses 5 and 6 are supplied with energy from 25-cycle synchronous generators, most or all of which consist of frequency-changers 8 which derive power from a larger 60-cycle transmission network, symbolized by the 60-cycle synchronous generators 9 and 10 and the 60-cycle tie-line 11 between the stations L and R.

In such a system, when the relatively large 60-cycle transmission network pulls apart between the stations L and R, the 25-cycle system which is synchronously coupled thereto at both ends will generally also pull apart, because there is, in general, much more generating capacity connected to the 60-cycle system than to the 25-cycle system. The speed at which the 25-cycle system pulls apart, or pulls out-of-step, is quite variable, depending upon the speed with which the 60-cycle system pulls out-of-step, and this depends upon the amount of load carried over the 60-cycle tie-line 11, and other factors.

It is necessary, therefore, to provide means for responding to the out-of-synchronism condition, both in the case of fast pull-out and in the case of slow pull-out of the 25-cycle tie-lines 1 and 2 between the stations L and R.

When two generating points on the system pull out-of-step with each other, the voltage on the system at a point which is somewhere near midway, electrically, between the internal generator voltages, falls nearly to zero and rises to full value again. This cycle of operation is repeated each time one power-source or generator slips a pair of poles with respect to the other. If the point at which the tie-line is to be sectionalized, in the event of out-of-synchronism operation, is near the electrical center of the reactance joining the internal voltages of the two generators, the voltage of the sectionalizing point drops to a very low value each time the generator voltages pass through the position of 180° electrical phase displacement, this voltage becoming substantially zero at the electrical center of the system, and reaching higher and higher minimum values at points further and further removed from the electrical center.

Figs. 2 and 3 show how the magnitudes of the voltage and current may vary during out-of-synchronism conditions. It is to be noted that these figures do not show the instantaneous directions of the sinusoidal wave-forms of the alternating voltage and current, but show how the voltage and current fluctuate in their root-mean-square magnitude, that is, the scaler values of the voltage and current, without reference to the phase-relations thereof.

Normal load-conditions are depicted at 13 in Figs. 2 and 3. When the two generating stations start to drift apart, the voltage at some intermediate point of the tie-line drops in value, until it reaches a minimum value 14, Fig. 2, when the internal generator-voltages are 180° apart, with maximum current 15, Fig. 3. The voltage thereafter rises, and the current decreases, until the generator voltages come in phase with each other, at 360°, at which point the voltage is again a maximum, as indicated at 16, and the current is a minimum, as indicated at 17. During this half of the out-of-synchronism cycle, however, the voltage between the points 14 and 16 builds up in the opposite direction than it was at first, representing a condition of reverse power-flow. At the point 17, as the generator voltages pass through 360°, the current reverses, and changes from motoring to generating, and the cycle thereafter repeats itself, three successive cycles being illustrated in Figs. 2 and 3. No particular effort has been made, in these figures, to indicate accurately either the magnitudes or the accelerations involved in the pulling-apart of the two generators; it is merely intended to illustrate the general principles.

The time-scale, along the X-axis, has not been indicated in Figs. 2 and 3. The time for the completion of three cycles of out-of-synchronism pulsations may be of the order of one to five seconds, with fast pull-out, or it may require that long, or longer, for a single cycle of out-of-synchronism pulsation in the event of a slow pull-out.

Referring again to Fig. 1, it will be noted that there is an intermediate station D on the 25-cycle tie-line 1, 2 somewhere near the electrical center of the 25-cycle system, and in case of necessity, the interruption of the tie-line circuit is effected at this intermediate station D by means of circuit interrupters 21 and 22, respectively, in the tie-lines 1 and 2, and circuit interrupters 23 in the trolley conductors 3.

Fig. 4 shows the protective equipment at stations L and D. At the generator-station L, the generator-bus 5 is connected to the transmission lines 1 and 2 through the previously-mentioned step-up transformers 7, and circuit breakers 24 and 25 which are controlled by primary and secondary protection means, the nature of which will presently be indicated, for controlling the power-supply from the generator bus to the respective tie-lines 1 and 2, and for disconnecting the power-supply under certain abnormal conditions. The particular protective means, and the particular times of operation, indicated in the present specification, are, of course, illustrative only, as various means may be adopted for the purpose.

The primary protective means at the station L is shown, in Fig. 4, as comprising a differential current relay 26, receiving power from current-transformers 27 and 28 in the lines 1 and 2, respectively. This relay 26 closes either one of its contacts 29 and 30, respectively, in response to predetermined conditions of unbalance, according as the line 1 or the line 2 carries the heavier current. It is designed to operate in a relatively quick time, which may be from .07 to .7 second, although we are not necessarily limited to this particular time of operation, except that it is faster in its operation than the secondary protection means which will be described later on. When the differential current relay 26 closes either one of its contacts 29 or 30, it trips out the appropriate associated breaker 24 or 25, respectively, so as to discontinue the power-supply to the line 1 or the line 2, as the case may be, which is at fault, as indicated by the heavier current-flow therein.

This primary protection means is intended to be quite selectively responsive to predetermined fault conditions, so that it will trip one of the breakers 24 or 25 only in case of an actual fault which requires the tripping of that breaker in order to clear the fault, care being taken to avoid the unnecessary tripping of either one of the circuit breakers 24 or 25. To this end, we preferably utilize a fault-detector in the shape of under-voltage relays 31 and 32, energized from the lines 1 and 2 through capacitor voltage-couplers 33 and 34, and having make-contacts 35, 36 and 37, 38 which short-circuit the operating coils 39 and 40 of the differential current relay 26 whenever full voltage, or a predetermined voltage, appears on both lines 1 and 2. The fault-detector 31—32 thus makes it possible to give the differential current relay a sensitive setting, by keeping current out of the relay-coils 39—40 under normal operating-voltage conditions and preventing tripping on load-unbalances.

The secondary protection means at the station L is illustrated, in Fig. 4, as comprising a pair of relatively slow over-current relays 41 and 42 which are energized from the current-transformers 27 and 28, respectively, and which close their contacts 43 and 44, in response to predetermined over-currents in the lines 1 and 2, in a time which is longer than the maximum time of operation of the primary protection means 26. This described operation of the over-current relays 41 and 42 may be inherent, in any manner, in the relay design, such as by having sufficient inertias so that it takes a certain necessary time in order to move the movable contact element far enough to close a contact, or by means of a dashpot which is indicated, at 45, for the sake of illustration, in Fig. 4. The closure of the over-current relay contacts 43 and 44 results in the tripping of the circuit breakers 24 and 25, respectively, as will be readily understood from the drawings.

In accordance with our invention, we have provided the over-current secondary-protection means 41 and 42 with an automatic recalibrating mechanism, involving variable-tap autotransformers 46 and 47 which are utilized to connect the operating coils of the over-current relays 41 and 42 to the current-transformers 27 and 28, respectively. The taps on the autotransformers 46 and 47 are changed by movable contact-members 49 and 50 carried by a movable contact-rod 51 which may be reciprocated by means of a reversible pilot-motor 52 controlled by means of a reversing-relay 53.

A distinctively novel feature of our recalibrating mechanism is that it responds automatically to the connection and disconnection of the various generators on the generator-bus 5 so that the settings of the over-current relays 41 and 42 are made larger, in the proper amount, when more generators are connected in service, and vice versa. Thus, we have shown three frequency-changers 8 at station L, having three synchronous generators 54, 55, 56, which are connected to the generator-bus 5 through circuit-breakers 57, 58, 59.

The reversing relay 53 for controlling the pilot-motor 52 is shown as a differential relay of the balance-beam type, having two opposed operating-coils 61 and 62. One of the operating-coils, for example, the coil 61, is constantly energized by means of a circuit including a resistor 63. The energizing-circuit of the other relay-coil 62 contains five small automatically controlled resistor-elements 64, 65, 66, 67 and 68, each having half the resistance of the resistor 63. The resistors 64 and 65 are cut in or out, according to the position of the autotransformer tap-changer rod 51, by means of a movable contact-member 69 thereon. The resistors 66, 67, and 68 are cut in or out, according to the positions of the generator circuit-breakers 57, 58, 59, by means of auxiliary switches 71, 72 and 73 carried thereby.

Thus, we obtain automatic recalibration of the secondary-protection over-current relays 41 and 42, as follows. When all of the generators 54, 55 and 56 are in service, the three resistors 66, 67 and 68 are short-circuited by the auxiliary breaker-switches 71, 72 and 73, and the two resistors 64 and 65 are in circuit with the operating coil 62 of the reversing relay 53, thus balancing the double resistor 63, which is permanently in circuit with the other coil 61 of the reversing relay. Under these conditions, the parts are in the position shown in Fig. 4, with all of each of the autotransformers 46 and 47 in shunt with the operating coils of the over-current relays 41 and 42, respectively, thus causing the secondary currents of the current-transformers 27 and 28 to flow, full-strength, through the over-current relays 41 and 42. In this position, the tap-changer rod is at its extreme left-hand limit of travel, further movement being safeguarded against by a limit-switch 74.

When one of the generators, say 56, is disconnected, its associated resistor 66 is connected in circuit with the reversing-relay coil 62, thus weakening the energization of the latter, so that the coil 61 pulls the relay over to the left and energizes the pilot-motor 52 in the direction necessary to move the tap-changing rod 51 to the right. When the contact-members 49 and 50 have moved over, one tap, on the autotransformers 46 and 47, the contact-member 69 will also have moved over, so as to short-circuit the resistor 65, thus restoring the reversing relay 53 to its balanced neutral position, and deenergizing the pilot-motor 52. The effect of the auto-transformers 46 and 47 is now to cause the over-current relays 41 and 42 to receive more current than is flowing in the secondary circuits of the respective current-transformers 27 and 28, thus causing the over-current relays to reach their settings at lower values of the line-currents.

When two of the generators 54, 55, and 56 are disconnected from service, the tap-changer rod 51 is moved over, one more tap, and it reaches its extreme right-hand limit of travel, where further movement is prevented by a limit-switch 75. When all three generators are disconnected, the energization of the reversing-switch coil 62 is weakened by the inclusion of three resistors, 66, 67, and 68, in its circuit, thus canting the movable element of the reversing switch to the left, but the pilot-motor 52 is not energized because of the opening of the limit-switch 75.

The over-current relays 41 and 42 of the secondary protection means are preferably also controlled by a fault-detertor which may, or may not, have the same setting at the fault-detector which controls the primary protection means 26. As illustrated, the under-voltage relays 31 and 32, are provided with additional contacts 76 and 77 which short-circuit the operating coils of the respective over-current relays 41 and 42 whenever the voltages on the respective lines 1 and 2 are above a predetermined value.

The protective equipment at the intermediate sectionalizing station D of the tie-lines 1 and 2 of the 25-cycle system includes means for automatically opening the sectionalizing breakers 21, 22, and 23 in the event of out-of-synchronism operation. As previously indicated, we have provided out-of-synchronism relays for both fast and slow pull-apart.

The relays for fast pull-apart are a pair of so-called voltage-dip relays 81 and 82 which are illustrated as being energized from capacitor voltage-couplers 83 and 84 associated with the lines 1 and 2, respectively. These voltage-dip relays 81 and 82 pick up, or drop out, as the line-voltage rises above, or falls below, the relay-setting. These relays have front-contacts 85 and back-contacts 86, which are made and opened, respectively, when the relay picks up.

In order to provide a sufficient number of contacts, of sufficient size to have the necessary current-carrying capacity, each of the voltage-dip relays 81 and 82 is illustrated as being associated with an auxiliary relay 91 and 92, respectively, the operation of which is controlled by the voltage-dip relays 81 and 82, so that the additional or heavy contact members may be placed on the auxiliary relays 91 and 92 rather than on the sensitive voltage relays 81 and 82. The operating coils of the auxiliary relays 91 and 92 are short-circuited by the back-contacts 86 of the voltage relays 81 and 82, respectively, when the voltage relays are deenergized or insufficiently energized. As soon as these voltage relays pick up, their back-contacts 86 are opened, and a circuit is completed from the positive relaying bus, through the front-contacts 85 of the relays 81 and 82, and thence through the operating coils of the auxiliary relays 91 and 92, respectively, to the negative relaying bus.

The relays 91 and 92 are shown also as completing a holding-circuit through front-contacts 93. When the voltage-dip relays 81 and 82 drop out, the above-mentioned energizing circuits of the auxiliary relays 91 and 92 are deenergized, including also the holding-circuits through the front-contacts 93, said holding-circuits being deenergized by the short-circuiting of the operating coils of the auxiliary relays 91 and 92 which occurs when the back-contacts 86 of the voltage relays 81 and 82 are closed.

The auxiliary voltage relays 91 and 92 are provided with back-contacts 94 and 95, respectively, which are connected in series with each other, and which are interposed between an auxiliary positive bus 99 and the operating coil of a counter-controlling relay 100 which controls the operation of a counting-chain for counting the number of times the line-voltage dips and comes back to normal. It will be noted that this counter-controlling relay 100 is energized only when both lines 1 and 2 have less than normal voltage thereon, and is deenergized when either line 1 or 2 has normal voltage thereon. This arrangement is made so that a dip in voltage on only one of the lines, or a complete deenergization of one line, does not start the counting-chain.

When the counter-controlling relay 100 is energized in response to the first voltage-dip, its front-contact 101 completes a circuit from the auxiliary positive bus 99 to the operating coil of a vibrator relay 102 which has a vibrating reed 103 carrying a weight 104 on its end, which causes it to continue to vibrate for 3 to 5 seconds after an impulse has been given thereto, and released again, the time of vibration being adjustable within said limits. As long as this reed continues vibrating, it alternately makes front- and back-contacts 105 and 106, which are utilized to complete a circuit from the auxiliary positive bus 99, through the reed 103, to a counting-chain timer-relay 107 of the retarded type, as indicated by the lag-ring 108 which so opposes any sudden change in flux therein as to make the relay quite slow in its drop-out movement, although it picks up quite rapidly because of the exceedingly strong magnetizing force which is provided by its operating coil. The counting-chain timer-relay 107 is provided with front-contacts 109 which are in series with the back-contacts 106 of the vibrating relay 102.

The counter-chain timer-relay 107 is also provided with front-contacts 110 which are made when the relay picks up, and which serve to energize a second auxiliary positive bus 111 from the first-mentioned auxiliary positive bus 99. This second auxiliary positive bus 111 is continued on, to a third auxiliary positive bus 112 which is normally connected to the second bus 111 but which may be disconnected therefrom, through means which will be described later on. The energization of the third bus 112 immediately energizes a first counting-chain relay 113, which picks up and closes its front-contact 114.

It will be well to consider, a moment, the condition of the apparatus at this stage of the operation. On the first voltage-dip on both transmission lines 1 and 2, the counter-controlling relay 100 had picked up, and had energized the vibratory relay 102, holding it steady with its reed against the front-contact 105, thereby energizing the timer 107. On the first restoration of line-voltage, the vibrating relay 102 is deenergized, thereby causing the vibrating reed 103 to commence its period of three to five seconds of vibration, or whatever time it is set for.

The retarded action of the timer relay 107 is sufficient to prevent this relay from dropping out during the periods between successive completions of the circuit through the alternating front and back-contacts 105 and 106 of the vibrating reed 103, until the amplitude of the vibrations is insufficient to keep the contact closed long enough to supply the necessary holding-energy for the timer relay. Then, in order to avoid a short period of chattering of the timer-relay 107, as the vibrating relay is making its last slight contacts at 105 and 106, the timer-relay contact 109 is provided, so as to open up when the timer relay first drops out, so that thereafter, if exceedingly brief contacts are made by the vibrating reed at 105 and 106, the timer-relay 107 receives energy from only the front-contact 105, and it immediately suffers a sudden reduction in the amount of energy which it receives, due to the cutting out of the back-contact 106 of the vibrating relay, thereby causing the timer-relay 107 to open positively and stay open throughout the remainder of the faint contacts of the dying vibrations of the reed 103.

We will now go back to the point in the operation, when the line-voltage was first restored, after the first voltage-dip. Under these conditions, the counter-controlling relay 100 is deenergized.

In its deenergized position, the counter-controlling relay 100 closes a back-contact 115 which extends a circuit from the third auxiliary positive bus 112, through the relay-contact 114, to a second counting-chain relay 116, which picks up and holds itself in, through a front-contact 117 which by-passes the relay contacts 114 and 115, so that the relay 116 remains in its picked-up position as long as the third auxiliary positive bus 112 is energized. The second counting-chain relay 116 has a back-contact 118 which is in series with the operating coil of the vibrating relay 102, so that the energization of the second counting-chain relay 116 in response to the first restoration of line-voltage locks out the vibrating relay 102, so that the latter is not reenergized even when the front-contact 101 of the counter-controlling relay 100 is again closed, on the second voltage dip. Thus, the vibrating reed 103 of the vibrating relay 102 is permitted to continue its uninterrupted period of vibration regardless of the subsequent movement of the counter-controlling relay 100, until its period of vibration is terminated, whereupon the second and third auxiliary buses 111 and 112 are necessarily deenergized through the front-contact 110 of the timer relay 107.

The second counting-chain relay 116 is further provided with a front-contact 119 which is in series with a front-contact 120 of the counter-controlling relay 100, so that, when the second voltage-dip occurs, the counter-controlling relay 100 will again pick up and extend a circuit from the third auxiliary positive bus 112, through the relay-contacts 119 and 120, to a third counting-chain relay 121. When this relay 121 picks up on the second voltage-dip, it completes a holding circuit, by means of its front-contact 122, around the relay-contacts 119 and 120, and it also closes a front-contact 123 which is in series with a back-contact 124 on the counter-controlling relay 100.

If the voltage of either tie line 1 or 2 rises a second time above its predetermined minimum normal value, determined by the setting of the voltage-dip relays 81 and 82, the counter-controlling relay 100 will again drop out, closing its back-contact 124, and extending a circuit from the second auxiliary positive bus 111, through the relay-contacts 123 and 124, to a fourth counting-chain relay 125. When this last-mentioned relay is energized, on the second restoration of line-voltage, it completes a holding circuit, through its front-contact 126, around the relay-contacts 123 and 124, and it also interposes a second break in the energizing circuit of the vibrating relay 102, this second break being introduced by means of back-contacts 127 carried by the relay 125. The fourth counting-chain relay 125 also has front-contacts 128 which are disposed in series with front-contacts 129 on the counter-controlling relay 100.

If the voltage dips a third time in both of the tie-lines 1 and 2, the counter-controlling relay 100 is again energized and it extends a circuit from the second auxiliary positive bus 111, through the relay-contacts 128 and 129, to the operating coil of a fifth or final counting-chain relay 130, which has a delayed drop-out action which is secured by a lag-ring 131, or other suitable means.

This last relay 130 of the counting chain has a front-contact 132 which serves to trip out the circuit breakers 21 and 22 in both of the tie-lines 1 and 2 in response to the third voltage-dip, this operation being accomplished by the energization of a tripping relay 133, the energizing circuit of which is completed through a circuit extending from the auxiliary positive bus 99, through an out-of-step operation-indicator 134, thence to the front-contact 132 of the relay 130, and thence to the energizing circuit 135 of the tripping relay 133. The tripping relay 133 has two front-contacts 136 and 137 which close the tripping circuits of the breakers 21 and 22, respectively.

The last relay 130 of the counting chain has a holding circuit which is provided by a front-contact 138 which by-passes the relay-contacts 128 and 129, which insures positive action notwithstanding chattering or imperfect contacts in either one of the relay contacts 128 or 129.

The last relay 130 of the counting chain also has a back-contact 139 which disconnects the third auxiliary positive bus 112 from the second auxiliary positive bus 111, thus releasing the relays 113, 116 and 121 which no longer need to be held closed and which thus constitute an unnecessary drain on the relaying buses. The deenergization of the relay 116 closes the back-contact 118 of the latter, but this does not effect the reenergization of the vibrating relay 102, because of the interruption of this circuit at the back-contact 127 of the relay 125. The vibrating relay thus continues to vibrate until it finishes its set period of vibration.

It will thus be noted that, at the first restoration of the line-voltage after the first voltage-dip, the vibrating relay 102 starts its set course of vibration and continues to do so for its allotted period of 3 to 5 seconds, or any other predetermined time. Starting with the first voltage-dip, the counting-chain relays 113, 116, 121, 125, and 130 begin operating, one after another, as normal line-voltage conditions are alternately restored and lost again, until, on the third voltage-dip, the last counting-chain relay 130 is energized and actuates the tripping relay 133 which opens the line circuit-breakers 21 and 22, provided that all of this operation takes place before the vibrating relay 102 stops vibrating. If this complete chain of operations is not completed within that time, the timer relay 107 drops out opening its back-contact 110 and thus deenergizing any one of the counting-chain relays 113, 116, 121, and 125 that may have been energized meanwhile, so that the apparatus is then in condition for a new operation just as if nothing had happened. In this way, we are enabled to discriminate between a single interruption and restoration of voltage which might result from a number of causes other than out-of-synchronism operation, and a continuance of this cycle for any predetermined number of times within a given period, depending upon the number of relays that we use, in accordance with our counting-chain and our timing elements 102 and 107. This takes care of the fast drifting out-of-step of the two ends of the tie-lines 1 and 2.

In cases where the trolley-conductor circuit is normally connected together across the circuit-interrupting point of the transmission lines 1 and 2, as is done in the illustrated case by means of the trolley breaker 23, it is necessary to open the trolley breaker when the line breakers 21 and 22 are opened, and this may be conveniently accomplished by back-contacts 141 and 142 on the line breakers 21 and 22, which are utilized to complete a tripping circuit to the trolley breaker 23.

The element used for sectionalizing the tie-line 1, 2, in the event of slow pull-apart, is an over-current relay 143 (Fig. 4), so connected as to totalize the current in all of the lines, or practically all of the lines, connecting the two supply points L and R (Fig. 1). This over-current relay 143 is energized cumulatively from current transformers 144 and 145 connected in lines 1 and 2 at station D. In order to allow for occasional brief power-exchange conditions under which extremely high load-currents may be transmitted by the tie-lines 1, 2, and in order to avoid the necessity for utilizing a relay-setting high enough to avoid these extreme power-exchange currents, thereby running into the difficulty of not responding to out-of-synchronism currents when there is only a small total generator-capacity on the system, we preferably utilize a fault-detector in connection with our over-current relay 143, so as to normally hold this over-current relay out of service, and connecting it in service only in the event of predetermined fault-conditions. One means to this end is shown in Fig. 4, the same comprising two short-circuiting relays 146 and 147 which are connected to short-circuit the operating coil of the over-current relay 143, by means of either of their front-contacts 148 and 149, when there is normal voltage on either one or both of the tie-lines 1 and 2.

The operating coil of the short-circuiting relay 146 is energized by means of a front-contact 151 on the auxiliary voltage relay 91 which responds to the voltage on the line 1. The operating coil of the short-circuiting relay 147 is energized by means of a front-contact 152 on the auxiliary voltage relay 92 which is energized whenever there is normal voltage on the line 2. By normal voltage, we mean voltage such as is tolerated on the trolley circuit, which may be as low as 50 or 60 percent of the rated voltage.

With the particular connections shown in Fig. 4, the over-current relay 143 is normally short-circuited by both of the short-circuiting relays 146 and 147. If the voltage drops below the relay-settings of the voltage dip relays 81 and 82 on both of the tie-lines 1 and 2, these short-circuiting relays 146 and 147 become deenergized and remove the short-circuit from the current winding of the over-current relay 143, permitting the latter to function if there is a sufficient over-current at the same time.

The over-current relay 143 has front-contacts 153 which serve to make a connection from the positive relaying bus to the energizing circuit 135 of the tripping relay 133, thereby tripping both of the line circuit-breakers 21 and 22.

The over-current relay 143 is designed to be somewhat sluggish in its operation, this sluggishness being obtained by any suitable means, and being symbolized by the showing of a light dashpot 154. The over-current relay 143 should be given a sufficiently long time-setting so that it will not trip for fault-conditions which are corrected by the primary protection means 26 at either generating station L or R. In other words, sufficient time should be allowed to permit the differential current relay 26 to operate, and sufficient time after that to permit the circuit breaker 24 or 25 to open its contacts and cease arcing, and time for opening any step-down-transformer breakers 155 or any other breakers necessary to clear the faulty line, before the over-current relay 143 at the intermediate station D shall close its tripping contact 153. This necessitates a certain minimum time-setting below which it is not desirable to set the over-current relay 143.

At the same time, it is desirable to have the over-current tie-interrupting relay 143 operate before the secondary protection means 41, 42, at either one of the generating stations L or R so that the generating stations will not be disconnected from both lines 1 and 2 in response to the heavy circulating currents which flow in the tie-lines 1 and 2 during out-of-synchronism conditions. This means that the time required for the tie-interrupting over-current relay 143 to pick-up, plus the time required for the circuit breakers such as 21 and 22 to cease arcing, must be less than the time required for the secondary protection relays 41 and 42 at the generating stations to pick-up. In one instance, we have used a time-setting of 1.5 seconds on the tie-interrupting over-current relay 143 at the intermediate station D, and a time setting of 2.3 seconds at the corresponding current on the secondary protection over-current relays 41 and 42 at the generating station L.

Referring back to Fig. 2, it will be noted that we have indicated, by a dotted line 156, the voltage-relay setting of the fault-detector or voltage-dip relays 81 and 82 (Fig. 4). The over-current relay 143 (Fig. 4) is not energized except when the voltage is below the setting 156 in Fig. 2, so that it will be seen that, during out-of-synchronism conditions, the over-current relay 143 will be energized only during the peaks of the current surges, as indicated by the shaded areas in Fig. 3. If the speed at which the two 25-cycle generating stations L and R pull-apart is so great that the duration of one of the shaded areas in Fig. 3, during which the over-current relay 143 is energized, is less than the time-setting of the relay, which is 1.5 seconds in the illustration given, this over-current relay will not pick up during the first over-current period of out-of-synchronism movement, and it may become re-set, or practically re-set, before the second shaded area in Fig. 3, so that it might never pick up. Thus, we have provided the first-described out-of-synchronism relaying apparatus utilizing our counting-chain for responding to fast pull apart.

Our over-current relay 143, for responding to slow pull-apart of the two 25-cycle generating stations, is reliably operative to respond to prolonged overcurrent pulsations which occur during slow pull-apart, when the duration of each shaded area in Fig. 3 is commensurate with, or greater than, the time-setting of the over-current relay 143 or when the over-current relay will operate in a few dips. The over-current relay 143 trips out the tie-interrupting breakers 21 and 22 in response to the over-current swing of the slow out-of-synchronism movement, thereby affording protection under circumstances when the voltage cycle-counter would not give protection at all, unless the overall time-settings were made rather undesirably long.

In the particular railroad electrification system illustrated in the drawings, there were conditions of operation, when other interconnections were made, beyond those shown in Fig. 1, whereby the primary protective means in some stations required more time for tripping, thus necessitating an over-current relay-setting longer than 1.5 seconds at the intermediate sectionalizing station D, in order that this station should not sectionalize the tie-lines before a fault could be cleared by the proper primary fault-responsive protective means at the various generating stations. This constituted only a rare emergency operating-condition, which was taken care of, in the apparatus shown in Fig. 4, by utilizing a second over-current relay 160 at the sectionalizing sub-station D, said relay having a front-contact 161 which closes, to energize the tripping relay 133, after a long time-setting of, said 4 seconds, as indicated by the heavy dashpot 162 in Fig. 4.

The operating coils of the two over-current relays 143 and 160 are connected in series across the current-responsive relay-supply circuit. The operating coil of the long-time over-current relay 160 is normally short-circuited by the energization of a relay 163 which is controlled by a double-throw push-button 164. When the push-button 164 is in one position, it energizes this relay 163 and short-circuits the current-coil of the long-time over-current relay 160. When the push button 164 is in the other position, it energizes another relay 165 which has a front-contact 166 for short-circuiting the current-coil of the short-time over-current relay 143. The relay 165 also has a back-contact 167 which disconnects the auxiliary positive bus 99 from the positive terminal of the relay supply source, so as to render the automatic voltage-dip counter inoperative under these conditions.

Our invention also provides a safeguard against a system-disturbance, such as regulator-trouble in one of the generator-stations, or extreme overload conditions in only one section of the system, but resulting in a general depression of the trolley-voltage to a point below which the rotating main or auxiliary tractive machines of the locomotives (not shown) will not operate properly. When such low-voltage conditions obtain on the trolley conductors at the sectionalizing station D, it is desired to take cognizance of that fact, and if said conditions persist for a predetermined time, to segregate the two sections of the electrification-system at that point, so that operable voltage-conditions may be maintained in at least half of the system, rather than putting the entire system out of service until the trouble can be corrected. There may even be a possibility that out-of-synchronism conditions might eventually be brought about by such a low-voltage condition, which constitutes another reason for segregating the faulty section from the good section when the former is so bad that the good section is no longer satisfactorily operative.

Accordingly, as shown in Fig. 4, we have provided an undervoltage relay 170, energized from a potential transformer 171 connected to one of the trolley conductors 3 at the sectionalizing station D. When the undervoltage relay 170 drops, its back-contact 172 energizes a timing-relay 173, which, after a regulable, predetermined time, closes its contact 174 and thus completes a circuit from the positive relaying bus, through said contact 174, to an operation-indicator 175, and thence to the energizing-circuit 135 of the tripping relay 133, which, as previously described, opens the line circuit-breakers 21 and 22, and through them the trolley breaker 23. The trolley-voltage timer 173 may be of any suitable type, being indicated very diagrammatically as having both a lag-ring 176 and a heavy dash-pot 177 for securing the desired time-delay, but any other type of timer may be utilized.

While Fig. 4 shows two out-of-synchronism detectors, one designed more particularly for fast pull-apart, and the other designed more particularly for slow-pull-apart, it is to be understood that either protective means may be utilized alone, where it is felt that either one may be made to cover the expected range of speeds of pull-apart.

The overcurrent protective mechanism for detecting out-of-synchronism conditions possesses the advantages of adjustable current-settings and adjustable time-settings which provide selectivity with respect to other sectionalizing points, rendering this mechanism more advantageous, in these respects, than the counting-chain system.

An important advantage of the counting chain is its ability to operate to sectionalize the system in the event of rapid pull-apart, and in its utilization of a counted number of alternate voltage-dips and voltage-restorations, thereby providing a sure discrimination from fault conditions which do not result in loss of synchronism.

Figs. 5 and 6 show modifications of the overcurrent out-of-step detector, which may be substituted for the corresponding detector in Fig. 4, or which may be utilized alone, without the counting-chain detector.

In Fig. 5, the sectionalizing breaker 21 in line 1 is directly tripped by a front-contact 180 of an overcurrent relay 181 which is similar to the overcurrent relay 143 of Fig. 4. It is energized from a line-current transformer 182, and is provided with a dashpot 183 similar to the corresponding dashpot 154 in Fig. 4. There is provided a fault-detector in the shape of an undervoltage relay 184 which is energized from a potential transformer 185 so that normal line-voltage causes the relay to pick up, opening its back-contact 186.

The improvement introduced in Fig. 5 consists in the incorporation of means for causing a voltage-dip to quickly remove a short-circuit on the current-transformer 182, but arranged so that a voltage-restoration will not remove said short-circuit for a predetermined time. These results are obtained by means of a timer-relay 187 which is set in operation by a closure of the back-contacts 186 on the undervoltage relay, and which opens its back-contacts 188 quickly, upon the energization of the timer-relay 187. Upon deenergization of the timer-relay 187, the back-contacts 188 close, but only after a predetermined time which is controlled by a dashpot 189 or other timing means. The contacts 188 are connected across the operating coil of the overcurrent relay 181.

The effect of the timer 187 will be better understood upon reference to Figs. 2 and 3. In these figures, the time-lag in the opening and closure of the fault-detector contacts is ignored, which is permissible if the time represented by Figs. 2 and 3, on the X-axis is large. But if the frequency of the out-of-synchronism pulsations increases, as in very fast pull-apart, the total time represented by Figs. 2 and 3 becomes much smaller, and hence the lag of the fault-detector will become an appreciable part of the total time. This will result in the shifting, to the right, of both the beginning and the ending of each shaded area in Fig. 3, and such shifting may be small or great, and may have different values for the beginning and ending, respectively. If this rightward shifting is large, there will be a tendency for the voltage relay to remain permanently energized or deenergized, depending on whether the average voltage is greater or less than the relay-setting.

These difficulties in the response to the root-mean-square voltage, by the voltage relay, during rapid pulsations in the out-of-synchronism power, are largely eliminated by the introduction of the timer-relay 187 in Fig. 5. With the aid of this relay 187 it is possible to cause the combined effect of the undervoltage relay 184 and the timer-relay 187, which together constitute the fault-detector, to be, that the overcurrent relay 181 will be energized promptly upon the occurrence of the first voltage dip to a value indicated by the relay-setting 156 in Fig. 2, and the overcurrent relay will thereafter remain continuously, or substantially continuously, in service during even fairly rapid pull-apart, so that the time-setting of the overcurrent relay, as determined by the dashpot 183 may be independent of the duration of each individual voltage-dip.

It is desirable that the voltage-responsive relay 184 (Fig. 5) shall be designed to respond as rapidly as possible to integrated power, or average or root-mean-square values of voltage, without responding to individual cycles of the line-frequency voltage-wave. It will be remembered that Fig. 2 shows integrated or root-mean-square voltage, so that the cycles shown are not line-frequency cycles of the alternating voltage-wave, but much slower cycles of the pulsations in root-mean-square voltage due to out-of-synchronism conditions.

We are not limited to mechanical relays, as distinguished from tube-relays, or to the use of a fixed, predetermined time in the delay response of the fault detector to a restoration of voltage after a voltage-dip. Both of these variations are illustrated in Fig. 6.

In Fig. 6, the voltage-dip-response is obtained by means of a tube 190, controlling an auxiliary voltage-dip relay 191, while the response to a subsequent restoration of the line-voltage after a voltage-dip is obtained by means of a second tube 192, controlling an auxiliary restoration-relay 193, which may, or may not, be associated with a slight time-hesitation-means for delaying its pick-up action, as indicated by the light dashpot 194.

The tubes 190 and 192 are illustrated as being of the grid-glow type, each having a small-area anode 195, a cold, large-area cathode 196, and a control-electrode called a grid 197, usually located quite close to the anode. When the grid gets sufficiently positive with respect to the cathode, even for a very brief moment of time, a glow-discharge starts in the tube and instantly spreads over to the anode, whereafter the anode-cathode discharge commences, and thereafter continues independently of the grid.

The grid-glow tubes are controlled in response to the line-voltage by means of a potential transformer 200, feeding through a double-wave rectifier 201, and an inductor 202, to a resistor 203. The size of the inductor necessary to properly smooth the rectified voltage-wave may be reduced by utilizing one or more filter-capacitors 204. An intermediate point 205 of the resistor 203 is connected to the positive bus (+) of the station relay supply circuit, as are also the two anodes 195 of the tubes 190 and 192. Other resistor-taps 206 and 207, on opposite sides of the intermediate point 205, are connected to the grids 197 of the respective tubes 190 and 192 through current-limiting resistors 208 and 209.

The voltage-dip-responsive tube 190 has its anode 195 connected to the positive supply-bus (+) through a back-contact 211 of the auxiliary restoration-responsive relay 193. The cathode 196 of the tube 190 is connected to the negative supply bus (−) through the operating coil of the auxiliary voltage-dip relay 191, and an auxiliary breaker-switch 213 which opens when the circuit-breaker 21 opens.

The voltage-restoration-responsive tube 192 has its anode 195 connected to the positive supply-bus (+) through the operating coil of the auxiliary restoration-responsive relay 193, while its cathode 196 is connected to an intermediate negative voltage obtained by means of a potentiometer 215 which is connected across the positive and negative buses (+) and (−), with the breaker-switch 213 interposed in the negative-bus connection. Between the potentiometer 215 and the cathode 196 of the restoration responsive tube 192 is interposed a front contact 217 of the auxiliary voltage-dip relay 191.

It is possible to utilize tube relays also for the current-responsive element, as well as for the voltage-responsive elements. In Fig. 6, however, a mechanical-type overcurrent relay 181 is shown, the same as in Fig. 5, and its terminals are normally short-circuited by a back-contact 218 on the auxiliary voltage-dip relay 191.

The operation of the system shown in Fig. 6 will best be understood by reference to the curves of Figs. 7 and 8. The rectified voltage-wave is shown at 220 in Fig. 7. This is the voltage that would be impressed on the resistor 203 if there were no inductance in the circuit. The average value of this rectified voltage-wave is indicated at 221 in Fig. 7. This is the voltage that would be impressed on the resistor 203 if the inductor 202 had an infinite value, or if the filter 204 worked perfectly. The actual voltage impressed on the resistor 203 has an intermediate value, as indicated by the dotted wavy line 222 in Fig. 7.

Fig. 7 shows a voltage-dip in the line-voltage. At a certain drop in voltage, as indicated by the value 223, it is desirable to cause the voltage-dip tube 190 to become conducting, and this action is obtained when the partially smoothed wave 222 crosses the critical value 223. (It will be noted that Fig. 7 is drawn as if the full rectifier output were applied to the anode-grid circuit of the tube 190, instead of only the portion included between the taps 205 and 206, which merely involves a change of scale, as will be obvious to those skilled in the art.) When the line-voltage rises again to some higher value, as indicated at 224 in Fig. 7, it is desired to cause the restoration-responsive tube 192 to become conducting, and this action is obtained when the partially smoothed wave 222 crosses the critical value 224.

Fig. 8 shows the anode and grid potentials 225 and 226 of the voltage-dip tube 190, and the anode and grid potentials 227 and 228 of the voltage-restoration tube 192, all plotted with reference to the cathode-potentials of the respective tubes. As a matter of fact, the anodes of the two tubes are both at the same potentials while the cathodes are at different potentials, but in Fig. 8 the cathode-potential of each tube has been taken as the datum-line to which all other potentials of that tube are referred.

In the voltage-dip-responsive tube 190, the grid-cathode potential 226 is less than the anode-cathode potential 225. When the line-voltage decreases, the grid-cathode voltage 226 increases, approaching the anode-cathode voltage 225, and at a certain critical value 229 the glow-discharge starts, picking up the auxiliary voltage-dip relay 191 (Fig. 6). This removes the short-circuit from the overcurrent relay 181 and also applies voltage to the cathode 196 of the second tube 192 which responds to a restoration of the line voltage.

If the line-current is above the setting of the overcurrent relay 181 (Fig. 6), the latter begins to operate, in a time determined by the dashpot 183.

When the line-voltage begins to come back to normal, after a dip, the grid-cathode potential 228 (Fig. 8) of the second tube 192 rises, because the voltage tapped off of the resistor 203 (Fig. 6) adds on to the anode-cathode potential 227 (Fig. 8). At a predetermined critical value 230, Fig. 8, the second tube 192 becomes conductive, picking up its auxiliary relay 193 and opening the back-contact 211 of the auxiliary relay after a time-delay determined by the dashpot 194, if the dashpot is used. When the back-contact 211 is opened, the anode-cathode circuit of the first tube 190 is opened, thereby releasing the auxiliary voltage-dip relay 191 which re-opens the anode-cathode circuit of the voltage-restoration tube 192 and at the same time re-applies the short-circuit to the operating-coil of the overcurrent relay 181. This restores the apparatus to its original normal condition, ready to respond, as previously described, to another voltage-dip, or, if the time delay introduced by the dashpot 194 is long enough for a second voltage-dip to be already under way, the voltage-dip tube 190 will immediately again spill over, instantly removing the short-circuit from the overcurrent relay 181 before the latter has had time to reset. It will be noted that the dashpot 194 does not delay the dropping-out action of the auxiliary voltage-restoration relay 193.

While we have shown our invention in several preferred forms of embodiment, it will be obvious that many changes in the arrangements of the voltage-dip counter and other details of the connections of the various other parts may be resorted to without departing from the essential spirit and theory of our teachings. We desire, therefore, that the appended claims shall be accorded the broadest interpretation consistent with their language and the prior art.

We claim as our invention:

1. Out-of-synchronism responsive means for an electric tie-line of a synchronous alternating-current transmission system, said system including means for, at times, interrupting the circuit of said tie-line, said out-of-synchronism responsive means including, in combination, means for counting and responding to a plurality of cycles of a predetermined drop and restoration of tie-line voltage within a predetermined time, and means for responding to a sustained overcurrent condition that persists for a predetermined time.

2. Protective means for a synchronous alternating current system comprising a plurality of generator stations, a tie-line connected therebetween, primary and secondary protection means for controlling the power-supply from each generating station to the tie-line and for disconnecting the power-supply under abnormal conditions in connection with said power-supply from said generating stations to said tie-line, the primary protection means acting promptly and being selectively responsive to predetermined fault conditions, the secondary protection means acting only after a time-delay and being less selective in its response to abnormal conditions, sectionalizing circuit-interrupter means disposed at an intermediate point in said tie-line, and sectionalizing protective means for automatically controlling said sectionalizing circuit-interrupter means, said sectionalizing protective means being responsive to abnormal tie-line conditions and acting in a time between the times of said primary and secondary protection means.

3. Protective means for a synchronous alternating-current transmission system comprising a plurality of generator stations, a tie-line connected therebetween, primary and secondary protection means for controlling the power-supply from each generating station to the tie-line and for disconnecting the power-supply under abnormal conditions in connection with said power-supply from said generating stations to said tie-line, the primary protection means acting promptly and being selectively responsive to predetermined fault conditions, the secondary protection means acting only after a time-delay and being less selective in its response to abnormal conditions, sectionalizing circuit-interrupter means disposed at an intermediate point in said tie-line, and sectionalizing protective means for automatically controlling said sectionalizing circuit-interrupter means, said sectionalizing protective means including overcurrent means operative in a time between the times of said primary and secondary protection means.

4. Protective means for a synchronous alternating-current transmission system comprising a plurality of generator stations, a tie-line connected therebetween, primary and secondary protection means for controlling the power-supply from each generating station to the tie-line and for disconnecting the power-supply under abnormal conditions in connection with said power-supply from said generating stations to said tie-line, the primary protection means acting promptly and being selectively responsive to predetermined fault conditions, the secondary protection means acting only after a time-delay and being less selective in its response to abnormal conditions, sectionalizing circuit-interrupter means disposed at an intermediate point in said tie-line, and sectionalizing protective means for automatically controlling said sectionalizing circuit-interrupter means, said sectionalizing protective means including overcurrent means operative in a time between the times of said primary and secondary protection means, and means for normally deenergizing said overcurrent means and for energizing the same only in the event of abnormal tie-line conditions indicative of faulty operative conditions.

5. Protective means for a synchronous alternating-current transmission system comprising a plurality of generator stations, a tie-line connected therebetween, primary and secondary protection means for controlling the power-supply from each generating station to the tie-line and for disconnecting the power-supply under abnormal conditions in connection with said power-supply from said generating stations to said tie-line, the primary protection means acting promtply and being selectively responsive to predetermined fault conditions, the secondary protection means acting only after a time-delay and being less selective in its response to abnormal conditions, sectionalizing circuit-interrupter means disposed at an intermediate point in said tie-line, and sectionalizing protective means for automatically controlling said sectionalizing circuit-interrupting means, said sectionalizing protective means including means for counting and responding to a plurality of cycles of a predetermined drop and restoration of tie-line voltage within a predetermined time.

6. Out-of-sychronism responsive means for an electric tie-line of a synchronous alternating-current transmission system, said system including means for, at times, interrupting the circuit of said tie-line, said out-of-sychronism responsive means including means for counting and responding to a plurality of cycles of a predetermined drop and restoration of tie-line voltage within a predetermined time.

7. Out-of-sychronism responsive means for an electric tie-line of a synchronous alternating-current transmission system, said system including means for, at times, interrupting the circuit of said tie-line, said out-of-synchronism responsive means comprising a plurality of generating stations having synchronous machines at opposite ends of said tie-line, said out-of-synchronism responsive means including means for responding to a cyclic change of electrical conditions in said tie-line, indicative of the possible slipping of the poles of a synchronous machine at one generating station with respect to a synchronous machine at the other generating station, means for counting a plurality of such cycles up to a predetermined number, timing means for responding to the beginning of said cyclic response, and means for effecting a predetermined operation in response to the counting of said predetermined number of cycles within a predetermined time.

8. Protective means for a synchronous alternating-current system comprising a plurality of generator stations including synchronous machines, a tie-line connected therebetween, sectionalizing circuit-interrupter means disposed at an intermediate point in said tie-line, and sectionalizing protective means for automatically controlling said sectionalizing circuit-interrupter means to effect a sectionalizing operation in said tie-line, said sectionalizing protective means including means for responding to a cyclic change of electrical conditions in said tie-line, indicative of the possible slipping of the poles of a synchronous machine at one generating station with respect to a synchronous machine at the other generating station, means for counting a plurality of such cycles up to a predetermined number, timing means for responding to the beginning of said cyclic response, and means so controlling said sectionalizing circuit-interrupter means as to efect said sectionalizing operation in response to the counting of said predetermined number of cycles within a predetermined time.

9. Out-of-synchronism responsive means for an electric tie-line of a synchronous alternating-current transmission system, said system including means for, at times, interrupting the circuit of said tie-line, said out-of-synchronism responsive means including a voltage-dip relay for responding to a predetermined drop and restoration of a relaying voltage, means for deriving said relaying voltage from the tie-line, means for counting a plurality of operations of said voltage-dip relay up to a predetermined number, timing means for responding to an operation of said voltage-dip relay, and means for effecting a predetermined operation in response to a completion of said predetermined number of operations of said voltage-dip relay within a predetermined time.

10. Out-of-synchronism responsive means for an electric tie-line of a synchronous alternating current transmission system, said tie-line comprising a multi-circuit transmission line constituting, in effect, a plurality of lines in parallel, said system including means for, at times, interrupting the circuit of said tie-line, said out-of-synchronism responsive means including means for counting and responding to a plurality of cycles of a predetermined drop and restoration of tie-line voltage within a predetermined time, and means for rendering said counting means inoperative in full voltage remains on any one of the parallel circuits of said tie-line.

11. Out-of-synchronism responsive means for an electric tie-line of a synchronous alternating-current transmission system, said tie-line comprising a multi-circuit transmission line constituting, in effect, a plurality of lines in parallel, said system including means for, at times, interrupting the circuit of said tie-line, said out-of-synchronism responsive means including means for responding to a sustained overcurrent condition that persists in the protected tie-line for a predetermined time, and means for normally deenergizing said overcurrent means and for energizing the same only in the event of a simultaneous loss of voltage, to at least a predetermined extent, in each one of the parallel circuits of said tie-line.

12. Out-of-synchronism responsive means for an electric tie-line of a synchronous alternating-current transmission system, said system including means for, at times, interrupting the circuit of said tie-line, said out-of-synchronism responsive means including, in combination, means for counting and responding to a plurality of cycles of a predetermined drop and restoration of tie-line voltage within a predetermined time, means for responding to a sustained over-current condition that persists for a predetermined time, and means for responding to a sustained under-voltage condition that persists for a predetermined time.

13. An electric-power system comprising two conductor sections and interconnection means normally disposed therebetween, in combination with means responsive to a predetermined dip in conductor-voltage for energizing a timer, said timer operating, if its energization is maintained for a predetermined time, to effect a predetermined circuit-operation, and means responsive to said circuit-operation for interrupting said interconnection.

14. Out-of-synchronism responsive means for an electric tie-line of a synchronous alternating-current transmission system, said system including means for, at times, interrupting the circuit of said tie-line, said out-of-synchronism responsive means including slowly acting overcurrent means responsive to a sustained over-current condition that persists for a predetermined time, means for normally deenergizing said overcurrent means, means quickly responsive to a predetermined dip in tie-line voltage for effecting the energization of said overcurrent means, and time-delay means responsive to a predetermined restoration of the tie-line voltage for deenergizing said overcurrent means.

15. Out of synchronism responsive means for an electric tie-line of a synchronous alternating-current transmission system, said system including means for, at times, interrupting the circuit of said tie-line, said out-of-synchronism responsive means including slowly acting overcurrent means responsive to a sustained over-current condition that persists for a predetermined time, means for normally deenergizing said overcurrent means, means quickly responsive to a drop of the tie-line voltage to a predetermined subnormal value, for effecting the energization of said overcurrent means, and means responsive to an increase of the tie-line voltage to a second predetermined subnormal value greater than the first-mentioned subnormal value, for deenergizing said overcurrent means.

16. Out-of-synchronism responsive means for an electric tie-line of a synchronous alternating-current transmission system, said system including means for, at times, interrupting the circuit of said tie-line, said out-of-synchronism responsive means including slowly acting overcurrent means responsive to a sustained over-current condition that persists for a predetermined time, means responsive to a sustained overcurrent means, means quickly responsive to a predetermined dip in tie-line voltage for effecting the energization of said overcurrent means, and time-delay means for assuring the continuance of the energization of said overcurrent means for a predetermined time after it is once put in operation by said voltage-dip-responsive means.

17. Protective means for an electrical system comprising a generator station and a pair of transmission lines connected thereto, primary and secondary protection means for controlling the power-supply from the generator station to each transmission line and for disconnecting the power-supply under abnormal conditions, the primary protection means acting promptly and being differentially and selectively responsive to predetermined fault conditions, said primary protection means comprising a differential relay for comparing conditions in the pair of transmission lines, and the secondary protection means acting, in general, only after a time delay and being less selective in its response to abnormal conditions, said secondary protection means comprising an individual fault-responsive relay for each of the protected lines, means for normally deenergizing both the primary and the secondary protection means, and fault-detector means for energizing the primary protection relay in the event of an abnormal voltage-dip on either transmission line and for energizing the individual secondary protection relay only in the event of a voltage-dip on its own transmission line.

18. Protective means for an electrical system comprising a generator-station bus and a transmission line normally connected thereto, transmission-line protection means for controlling the power-supply from said generator-station bus to said transmission line and for disconnecting said power-supply under abnormal conditions, a plurality of generators adapted for connection, from time to time, to said generator-station bus, a plurality of generator circuit-breakers interposed between said generators and said bus for connecting and disconnecting the several generators to and from the bus, and recalibrating means directly responsive to the number of generator circuit-breakers open or closed for automatically adjusting a setting of said transmission-line protective means in a substantially definitely predetermined relation to the connected generator capacity at all times, said recalibrating means including a pilot-motor, a differentially excited electromagnetic reversing-switch for controlling said motor, means for disturbing the balance of said electromagnetic reversing-switch in response to an operation of a generator circuit-breaker, and means for restoring said balance in response to the operation of the pilot-motor.

19. Protective means for an electrical system comprising a generator station and a pair of transmission lines connected thereto, primary and secondary protection means for controlling the power-supply from the generator station to each transmission line and for disconnecting the power-supply under abnormal conditions, the primary protection means acting promptly and being differentially and selectively responsive to predetermined fault conditions, said primary protection means comprising a differential relay for comparing conditions in the pair of transmission lines, and the secondary protection means acting, in general, only after a time delay and being less selective in its response to abnormal conditions, said secondary protection means comprising an individual fault-responsive relay for each of the protected lines, said primary and secondary protection means comprising serially connected current-responsive windings, variable transformer means whereby the strength of current in said secondary protection means may be varied with respect to that in said primary protection means, said generator station comprising a generator-station bus and a plurality of generators adapted for connection, from time to time, to said generator-station bus, a plurality of generator circuit-breakers interposed between said generators and said bus for connecting and disconnecting the several generators to and from the bus, and recalibrating means directly responsive to the number of generator circuit-breakers open or closed for automatically adjusting said variable transformer means.

MAX J. RUBEL.
EDWIN L. HARDER.